United States Patent Office 3,644,405
Patented Feb. 22, 1972

3,644,405
PHTHALIMIDE CONTAINING MONOAZO DYESTUFFS
Walter Horstmann, Cologne, Dietmar Kalz, Leverkusen, Gerhard Wolfrum, Opladen, and Edgar Siegel, Leverkusen, Germany, assignors to Farbenfabriken Bayer Aktiengesellschaft, Leverkusen, Germany
No Drawing. Filed Nov. 26, 1968, Ser. No. 779,225
Claims priority, application Germany, Dec. 6, 1967, P 16 44 236.7
Int. Cl. C09b 29/36
U.S. Cl. 260—156
2 Claims

ABSTRACT OF THE DISCLOSURE

Monoazo dyestuffs free from sulfonic acid groups are prepared which are valuable new pigment dyestuffs characterized by good fastness to light, solvents and migration, and by a good thermal stability when used for coloring papers, lacquers, varnishes, synthetic materials, pigment paste and printing colors. The dyestuffs correspond to the general formula

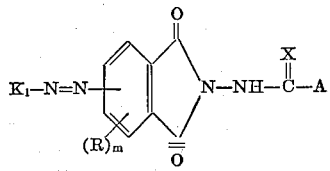

where A stands for an optionally substituted alkyl, aralkyl, carbocyclic or heterocyclic radical or for the radical

where $R_1$ and $R_2$, independently of one another, mean hydrogen, an optionally substituted alkyl, aralkyl or aryl radical;
X stands for an oxygen or sulfur atom or for NH;
$K_1$ is the radical of a monofunctional coupling component;
R is a substituent; and
m is an integer from 0–3.

---

The object of the present invention comprises new monoazo dyestuffs which are free from sulphonic acid groups and correspond to the formula

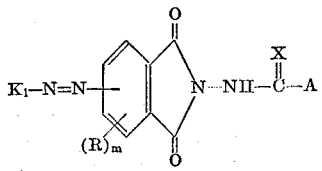 (I)

and a process for their production.

In the Formula I A stands for an optionally substituted alkyl, aralkyl, carbocyclic or heterocyclic radical or for the radical

where $R_1$ and $R_2$, independently of one another, denote hydrogen, an optionally substituted alkyl, aralkyl or aryl radical; X stands for an oxygen or sulphur atom or for NH; $K_1$ is the radical of a monofunctional coupling component; R is a substituent and m is an integer from 0 to 3.

Suitable alkyl radicals A are, for example, branched and straight-chain $C_1$–$C_8$ alkyl radicals, such as methyl, ethyl, propyl, isopropyl or butyl radicals.

Suitable aralkyl radicals are primarily benzyl radicals such as

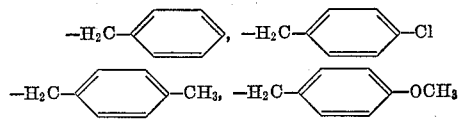

Suitable carbocyclic radicals are, in particular, optionally substituted aryl radicals, especially phenyl radicals or naphthyl radicals, such as

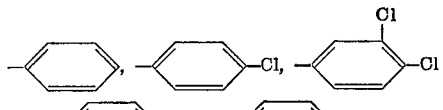

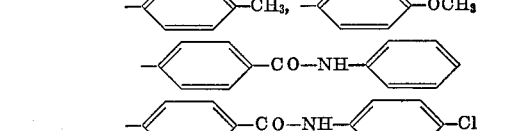

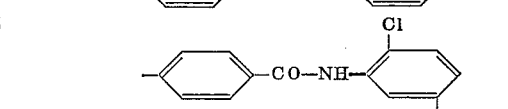

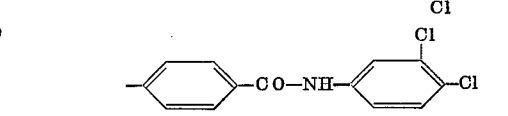

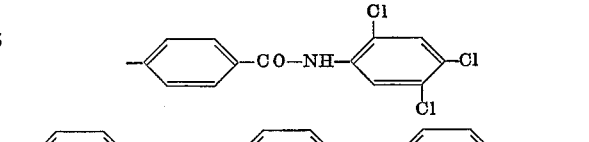

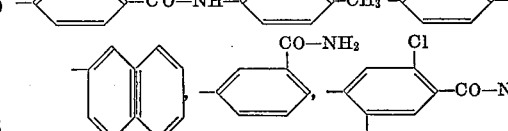

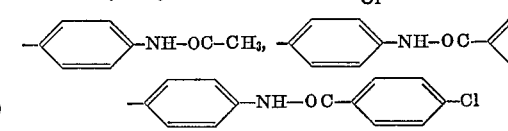

or cycloalkyl radicals such as cyclohexyl radicals.
Suitable heterocyclic radicals are, for example,

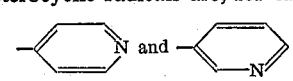

and suitable radicals

are, for example, $-NH_2$, $-NHCH_3$, $-NHC_2H_5$ and

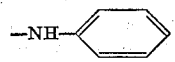

Examples of substituents R are primarily alkyl groups, such as methyl, ethyl and butyl groups; halogen atoms, such as fluorine, chlorine and bromine; alkoxy groups, such as methoxy and ethoxy groups; nitro groups and trifluoromethyl groups.

Suitable radicals $K_1$ are especially the radicals of 2-hydroxy-naphthoic acid-(3)-arylides, acetoacetic acid arylides, pyrazolones-(5)- and 5-aminopyrazoles.

The new azo dyestuffs of the Formula I are obtained by reacting azo compounds of the formula

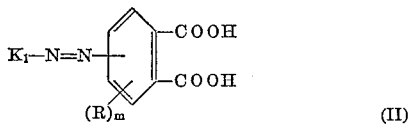
(II)

in which $K_1$, R and m have the same meaning as above, or their anhydrides, semiesters or neutral esters, with compounds of the formula

(III)

in which A and X have the same meaning as above, in a molar ratio of 1:1, optionally in the presence of suitable condensation agents, in a high-boiling organic solvent, and selecting the components in such a manner that the final dyestuffs are free from sulphonic acid groups.

A group of particularly valuable dyestuffs within the scope of the products of the Formula I are obtained by reacting compounds of the formula

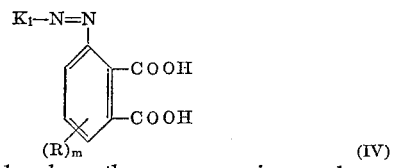
(IV)

in which $K_1$, R and m have the same meaning as above, or functional derivatives of these dicarboxylic acids, especially the mono- or diesters or anhydrides, with compounds of the Formula III, dyestuffs of the formula

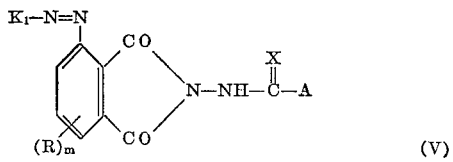
(V)

being formed.

Another process for the production of the azo dyestuffs of the Formula I consists in diazotising amines of the formula

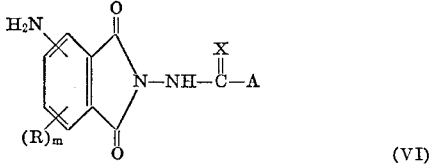
(VI)

in which A, R, X and m have the same meaning as above, in the usual manner and coupling with the coupling components $K_1$—H. The compounds of the Formula VI are obtained by the reaction of opitonally substituted 3- or 4-nitrophthalic acids or their functional derivatives, with compounds of the Formula III in a high-boiling organic solvent in the presence of acidic condensation agents and subsequent reduction of the resultant nitro compounds.

Preferred dyestuffs are those which are free from sulfonic acid groups and correspond to the general formula

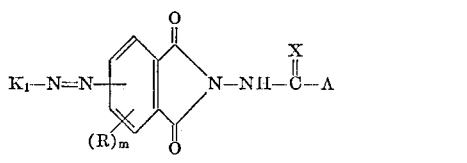

where A is selected from the group consisting of alkyl with 1–9 carbon atoms; cyclohexyl; phenyl; phenyl substituted by a member Cl, $CH_3$, $OCH_3$, $CONH_2$, or $NHOCCH_3$ benzyl, benzyl substituted by a member Cl, $CH_3$, or $OCH_3$; naphthyl, pyridyl; carbanilino phenylene; carbanilino phenylene substituted by a member Cl or $CH_3$, benzoylamino phenylene; and benzoylamino phenylene substituted by a member Cl or $CH_3$; or A is a radical

where $R_1$ and $R_2$ are selected from the group consisting of H; methyl, ethyl and phenyl; R is selected from the group consisting of alkyl with 1–4 carbon atoms, fluorine, chlorine, bromine, methoxy, ethoxy, nitro, or trifluoromethyl; m is an integer from 0 to 3; and $K_1$ is selected from the group consisting of 2-hydroxynaphthoic-acid-anilido; wherein the anilido residue of said 2-hydroxy-naphthoic-acid-anilido is unsubstituted or contains 1–3 substituents selected from the group consisting of methyl, methoxy, ethoxy, nitro, chloro and acetylamino; 3-methyl-pyrazolonyl-5 which is unsubstituted or contains one substituent selected from the group consisting of phenyl, chlorophenyl, methylphenyl, nitrophenyl, carbonamido, and carbomethoxy, acetoacetic acid anilido wherein the anilido residue of said acetoacetic acid anilido is unsubstituted or contains 1–3 substituents selected from the group consisting of chloro, methyl, methoxy, ethoxy and nitro; 2-hydroxynaphthoic - acid - naphthyl-amido; 2-hydroxy - naphthoylamino - benzimidazolonyl; 1-phenyl-3-methyl-5-amino-pyrazolyl; acetoacetic acid naphthylamido; acetoacetic acid amino benzimidazolonyl; or acetoacetic acid aminobenzothiazolyl and X is selected from the group NH, S, and O.

The starting dyestuffs of the Formula II or IV are obtained in usual manner by diazotising the optionally substituted aminophthalic acids or their functional derivatives and coupling with monofunctional coupling components. The following diazo components can be used for this purpose, for example:

3-amino-phthalic acid,
3-amino-phthalic acid dimethyl ester,
3-amino-6-methyl-phthalic acid,
3-amino-5-nitro-phthalic acid,
3-amino-6-methoxy-phthalic acid,
3-amino-4-methoxy-phthalic acid,
3-amino-6-chlor-phthalic acid,
3-amino-5,6-dimethoxy-phthalic acid,
4-amino-phthalic acid,
4-amino-3-chloro-phthalic acid,
4-amino-5-chloro-phthalic acid,
4-amino-phthalic acid dimethyl ester,
4-amino-3-methyl-phthalic acid,
4-amino-5-methyl-phthalic acid,
4-amino-3-methoxy-phthalic acid,
4-amino-5-methoxy-phthalic acid and
4-amino-3,6-dichloro-phthalic acid.

Examples of suitable monofunctional coupling components $K_1$—H are:

2-hydroxy-naphthoic acid-(3)-anilide,
2-hydroxy-naphthoic acid-(3)-2'-methyl-anilide,
2-hydroxy-naphthoic acid-(3)-(4'-methyl)-anilide,
2-hydroxy-naphthoic acid-(3)-(2'-methoxy)-anilide,
2-hydroxy-naphthoic acid-(3)-(4'-methoxy)-anilide,
2-hydroxy-naphthoic acid-(3)-(3'-nitro)-anilide,
2-hydroxy-naphthoic acid-(3)-(2'-chloro)-anilide,
2-hydroxy-naphthoic acid-(3)-(4'-chloro)-anilide,
2-hydroxy-naphthoic acid-(3)-(2',4'-dimethyl)-anilide,
2-hydroxy-naphthoic acid-(3)-(2'-methyl-5-chloro)-anilide,
2-hydroxy-naphthoic acid-(3)-(2'-methyl-4'-chloro)-anilide,
2-hydroxy-naphthoic acid-(3)-(2',5'-dimethoxy-4'-chloro)-anilide,
2-hydroxy-naphthoic acid-(3)-2,4'-dimethoxy-5'-chloro)-anilide, 2-hydroxy-naphthoic acid-(3)-(2'-methyl-4'-methoxy)-anilide,
2-hydroxy-naphthoic acid-(3)-(2'-methoxy-5-chloro)-anilide,
2-hydroxy-naphthoic acid-(3)-(2'-methyl-3-chloro)-anilide,
2-hydroxy-naphthoic acid-(3)-(naphthyl)-(1'))-amide,
2-hydroxy-naphthoic acid-(3)-(naphthyl-(2'))-amide,
2-hydroxy-naphthoic acid-(3)-(2'-ethoxy)-anilide,
2-hydroxy-naphthoic acid-(3)-(4'-ethoxy)-anilide,
2-hydroxy-naphthoic acid-(3)-(2'-methoxy-5'-methyl)-anilide,
2-hydroxy-naphthoic acid-(3)-(4'-acetylamino)-anilide,
5-(2',3'-hydroxy-naphthoylamino)-benzimidazolone,
1-phenyl-3-methyl-pyrazolone-5,
1-(4'-chlorophenyl)-3-methyl-pyrazolone-5,
1-(4'-methyl-phenyl)-3-methyl-pyrazolone-5,
1-(3'-nitrophenyl)-3-methyl-pyrazolone-5,
1-(2'-chlorophenyl)-3-methyl-pyrazolone-5,
1-phenyl-pyrazolone-5-carboxylic acid-3-amide,
1-phenyl-pyrazolone-5-carboxylic acid-3-methyl ester,
1-phenyl-3-methyl-5-amino-pyrazole,
aceto acetic acid anilide,
aceto acetic acid-2-chloro-anilide,
aceto acetic acid-2,4-dimethyl-anilide,
aceto acetic acid-2-methyl-anilide,
aceto acetic acid-2,5-dimethoxy-4-chloro-anilide,
aceto acetic acid-2-methoxy-anilide,
aceto acetic acid-naphthyl-(1)-amide,
aceto acetic acid-2-methyl-3-chloro-anilide,
aceto acetic acid-2-methyl-5-chloro-anilide,
aceto acetic acid-2-methyl-4-chloro-anilide,
aceto acetic acid-2,4-dichloro-anilide,
aceto acetic acid-2-nitro-4-chloro-anilide,
aceto acetic acid-2-nitro-4-methyl-anilide,
aceto acetic acid-2-nitro-4-methoxy-anilide,
aceto acetic acid-4-ethoxy-anilide,
aceto acetic acid-2-(6-ethoxybenzothiazolyl)-amide,
5-acetoacetylamino-benzimidazolone.

The condensation of azo compounds (II) or (IV) with compounds of the type (III) according to the invention is preferably carried out in a high-boiling organic solvent and in the presence of dehydrating agents. The condensation is performed, for example, at an elevated temperature, generally in the range from 80° C. to 240° C., preferably between 100° C. and 180° C., and, if desired, under pressure.

Compounds (III) which are suitable for the production of azo dyestuffs of the Formula I are, for example, semicarbazide, thiosemicarbazide, aminoguanidine and their substitution products, for example, 4-methyl-semicarbazide,
4-phenyl-semicarbazide,
4-benzyl-semicarbazide,
4-cyclohexyl-semicarbazide,
4,4-dimethyl-semicarbazide,
4-methyl-thiosemicarbazide,
4-phenyl-thiosemicarbazide,
4-benzyl-thiosemicarbazide,
4-cyclohexyl-thiosemicarbazide,
4,4-dimethyl-thiosemicarbazide,
N-amino-N'-methyl-guanidine,
N-amino-N'-phenyl-guanidine,
N-amino-N'-cyclohexyl-guanidine, or N-acetylhydrazine,
propionic acid hydrazide,
phenyl acetic acid hydrazide,
4-chloro-phenyl acetic acid hydrazide,
benzoic acid hydrazide,
4-chloro-benzoic acid hydrazide,
3,4-dichloro-benzoic acid hydrazide,
4-methyl-benzoic acid hydrazide,
4-methoxy-benzoic acid hydrazide,
4-carbanilino-benzoic acid hydrazide,
4-(4'-chloro-carbanilino)-benzoic acid hydrazide,
4-(3',4'-dichloro-carbanilino)-benzoic acid hydrazide,
4-(2',4',5'-trichloro-carbanilino)-benzoic acid hydrazide,
4-(4'-methyl-carbanilino)-benzoic acid hydrazide,
4-carbamido-benzoic acid hydrazide,
cyclohexane-carboxylic acid hydrazide,
naphthoic acid-2-hydrazide,
naphthoic acid-1-hydrazide,
nicotinic acid hydrazide,
isonicotinic acid hydrazide,
4-(2',5'-dichloro-carbanilino)-benzoic acid hydrazide,
4-acetyl-amino-benzoic acid hydrazide,
4-benzoyl-amino-benzoic acid hydrazide,
4-(4'-chloro-benzoylamino)-benzoic acid hydrazide,
4-(4'-methyl-benzoylamino)-benzoic acid hydrazide,
2,5-dichloro-4-carbamido-benzoic acid hydrazide,
3-carbonamido-benzoic acid hydrazide,
3-carbonamido-4-chloro-benzoic acid hydrazide.

Organic solvents which are suitable for condensing monoazo dyestuffs (II) or (IV) or their derivatives with compounds (III) are the following solvents boiling above 80° C.: benzene, toluene, xylenes, chlorobenzene, o-, m-, p-dichlorobenzene, trichlorobenzenes, quinoline, nitrobenzene, glacial acetic acid, cyclohexane, 1,2,3,4-tetrahydro-naphthalene, naphthalene, tetrachloro-ethylene, anisole, diphenyl ether, di-n-butyl ether decaline and mixtures of such solvents. The preferred condensation agents to be added are, for example, acidic dehydrating agents, such as formic acid, acetic acid, propionic acid, anhydrous sodium acetate, zinc chloride, iron(III) chloride, aluminum chloride and boron trifluoride.

The reaction of (II) and (IV), or of their derivatives, with (III) is carried out in a molar ratio of about 1:1, an excess of 10–20% of component (III) being preferably used, in order to achieve a complete conversion.

The products obtainable according to the invention are valuable new pigment dyestuffs which are generally characterised by good fastness to light, solvents and migration and by a good thermal stability in the various substrates. They are used for colouring papers, lacquers and varnishes and synthetic materials, such as e.g. plasticiser-containing polyvinyl chloride, polyethylene and mixed and graft polymers of acrylonitrile-butadiene-styrene, and for the production of pigment pastes and printing colours.

The parts given in the following examples are parts by weight, the temperatures are degrees centigrade.

EXAMPLE 1

9.5 parts of the monoazo dyestuff obtained from diazotised 3-amino-phthalic acid and 2-hydroxy-naphthoic acid-(3)-anilide are heated in a mixture of 225 parts o-dichloro-benzene and 25 parts glacial acetic acid at 110–120° for 1 hour. 4 parts 4-chlorobenzoic acid hydrazide are then added and the same temperature is maintained for a further 4 hours. The pigment is then filtered off with suction at 100°, washed with hot o-dichlorobenzene until the runnings are clear, and dried at 80° in a vacuum until the weight is constant. There are obtained 11.5 parts of red pigment of the formula

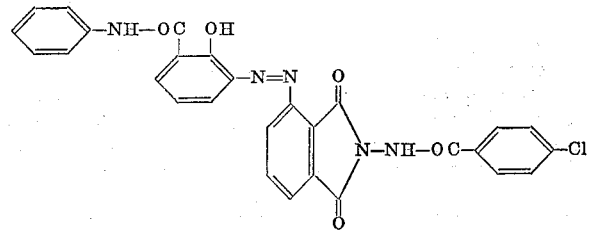

which is fast to light.

To improve the strength of colour, the product is around with the tenfold amount of sodium chloride in a ball mill for 20 hours, the salt is dissolved out with water, and the product is dried as above.

EXAMPLE 2

10.8 parts of the azo dyestuff obtained from 4-amino-5-methoxy-phthalic acid and 2-hydroxy-naphthoic acid-(3)-(4'-acetylamino)-anilide are heated in a mixture of 225 o-dichloro-benzene and 25 ml. glacial acetic acid at 120° for 2 hours, 6 parts 4-carbanilino-benzoic acid hydrazide are then added, the temperature of 120° is maintained for a further 15 hours, the product is filtered off with suction while hot, washed with hot o-dichlorobenzene and methanol, and dried. There are obtained 13.5 parts of a red pigment dyestuff of the formula

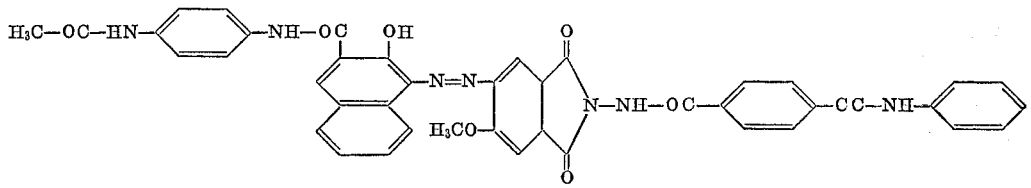

EXAMPLE 3

10 parts of the monoazo dyestuff obtained from 3-amino-phthalic acid and 2-hydroxy-naphthoic acid-(3)-(4'-ethoxy)-anilide are heated in a mixture of 225 parts o-dichlorobenzene and 25 parts glacial acetic acid at 110° for 30 minutes in order to form the anhydride. 6 parts 4-(4'-chloro-carbanilino)-benzoic acid hydrazide are then added and a temperature of 120° is maintained for 5 hours. The product is filtered off with suction at 100°, washed with 250 parts of hot o-dichlorobenzene and 100 parts methanol, and dried at 50°. There are thus obtained 15 parts of a red pigment dyestuff of the formula

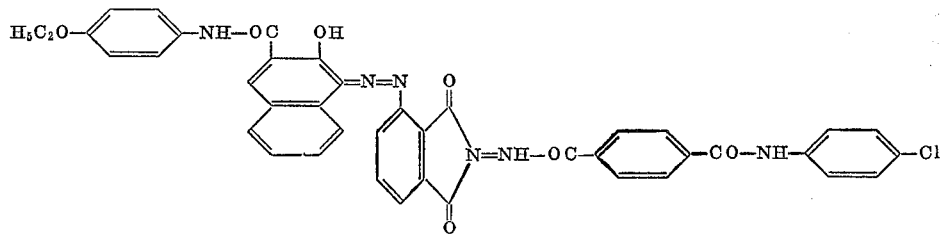

which is very fast to light and solvents.

EXAMPLE 4

9.1 parts of the azo dyestuff obtained from diazotised 3-amino-phthalic acid and 2-hydroxy-naphthoic acid-(3)-anilide are heated in a mixture of 200 parts chlorobenzene and 20 parts glacial acetic acid at 120° for 1 hour, 2.2 parts thiosemicarbazide are then added, and the temperature of 120° is maintained for a further 4 hours. The finished pigment is subsequently filtered off with suction at 100°, washed with 250 parts of hot chlorobenzene and 100 parts methanol, and dried at 50° until the weight is constant. The yield amounts to 10 parts of red pigment of the formula

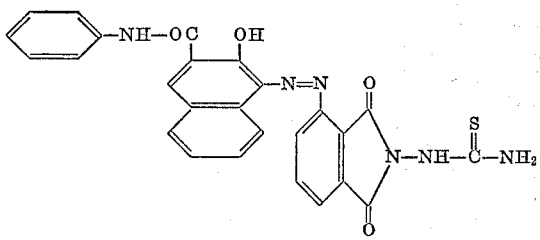

which is fast to solvents.

When the procedure described in the above examples is followed, but the diazo and coupling components and imidisation components of the Formula III there mentioned are replaced with the diazo and coupling components and the imidisation components listed in the following table, then valuable pigment dyestuffs are likewise obtained, which have the specified shades.

| Diazo component | Coupling component | Imidisation component | Shade |
| --- | --- | --- | --- |
| 3-amino-phthalic acid | 2-hydroxy-naphthoic acid-(3)-anilide | Semicarbazide | Red. |
| Do | do | 4-methyl-semicarbazide | Red. |
| Do | do | Aminoguanidine | Red. |
| Do | do | Acetylhydrazine | Red. |
| Do | do | Benzoic acid hydrazide | Red. |
| Do | do | 4-carbamido-benzoic acid hydrazide | Red. |
| Do | do | 4-carbanilino-benzoic acid hydrazide | Red. |
| Do | do | 4-(4'-chloro-carbanilino)-benzoic acid hydrazide | Red. |
| Do | do | 4-acetylamino-benzoic acid hydrazide | Red. |
| Do | do | 4-benzoylamino-benzoic acid hydrazide | Red. |
| Do | 2-hydroxy-naphthoic acid-(3)-4'-ethoxyanilide. | Semicarbazide | Red. |
| Do | do | Thiosemicarbazide | Red. |
| Do | do | 4-chloro-benzoic acid hydrazide | Red. |
| Do | do | 4-carbamido-benzoic acid hydrazide | Red. |
| Do | do | 4-carbanilino-benzoic acid hydrazide | Red. |
| Do | do | 4-(3'-chloro-carbanilino)-benzoic acid hydrazide | Red. |
| Do | do | 4-(3',4'-dichloro-carbanilino)-benzoic acid hydrazide | Red. |
| Do | do | 4-(2',4',5'-trichloro-carbanilino)-benzoic acid hydrazide | Red. |
| Do | do | 4-(4'-methyl-carbanilino)-benzoic acid hydrazide | Red. |
| Do | do | 4-acetylamino-benzoic acid hydrazide | Red. |
| Do | do | 4-benzoylamino-benzoic acid hydrazide | Red. |
| Do | 2-hydroxy-naphthoic acid-(3)-(2'-methyl)-anilide. | Thiosemicarbazide | Red. |
| Do | do | Semicarbazide | Red. |
| Do | do | 4-carbamido-benzoic acid hydrazide | Red. |
| Do | do | 4-(4'-chloro-carbanilino)-benzoic acid hydrazide | Red. |
| Do | do | 4-acetylamino-benzoic acid hydrazide | Red. |
| Do | do | 4-benzoylamino-benzoic acid hydrazide | Red. |
| Do | do | 4-(4'-chloro-benzoylamino)-benzoic acid hydrazide | Red. |
| Do | do | 4-carbanilino-benzoic acid hydrazide | Red. |

TABLE—Continued

| Diazo component | Coupling component | Imidisation component | Shade |
|---|---|---|---|
| 3-amino phthalic acid | 2-hydroxy-naphthoic acid-(3)-(4'-chloro)-anilide. | Thiosemicarbazide | Red. |
| Do | do | Semicarbazide | Red. |
| Do | do | 4-carbanilino-benzoic acid hydrazide | Red. |
| Do | do | 4-(4'-chloro-carbanilino)-benzoic acid hydrazide | Red. |
| Do | do | 4-(2',4,5'-trichloro-carbanilino)-benzoic acid hydrazide | Red. |
| Do | do | 4-(3',4'-dichloro-carbanilino)-benzoic acid hydrazide | Red. |
| Do | do | 4-acetylamino-benzoic acid hydrazide | Red. |
| Do | do | 4-benzoylamino-benzoic acid hydrazide | Red. |
| Do | do | 4-chloro-benzoic acid hydrazide | Red. |
| Do | 2-hydroxy-naphthoic acid-(3)-(4'-methoxy)-anilide. | 4-(4'-chloro-carbanilino)-benzoic acid hydrazide | Red. |
| Do | do | 4-benzoylamino-benzoic acid hydrazide | Red. |
| Do | do | Thiosemicarbazide | Red. |
| Do | do | 4-carbonamido-benzoic acid hydrazide | Red. |
| Do | 2-hydroxy-naphthoic acid-(3)-(2'-methoxy-5'-chloro)-anilide. | 4-(4'-chloro-carbanilino)-benzoic acid hydrazide | Red. |
| Do | do | 4-acetylamino-benzoic acid hydrazide | Red. |
| Do | do | Semicarbazide | Red. |
| Do | do | Thiosemicarbazide | Red. |
| Do | 2-hydroxy-naphthoic acid-(3)-(2'-methoxy)-anilide. | Acetylamino-benzoic acid hydrazide | Red. |
| Do | do | 4-carbonamido-benzoic acid hydrazide | Red. |
| Do | do | 4-carbanilino-benzoic acid hydrazide | Red. |
| Do | do | 4-benzoylamino-benzoic acid hydrazide | Red. |
| Do | Aceto acetic acid anilide | Thiosemicarbazide | Yellow. |
| Do | do | 4-(4'-chloro-carbanilino)-benzoic acid hydrazide | Do. |
| Do | Aceto acetic acid-2-chloro-anilide | 4-(4-chloro-carbanilino)-benzoic acid hydrazide | Do. |
| Do | do | 4-carbonamido-benzoic acid hydrazide | Do. |
| Do | Aceto acetic acid-2,5-dimethoxy-4-chloro-anilide. | Semicarbazide | Do. |
| Do | do | Thiosemicarbazide | Do. |
| Do | do | 4-carbonamido-benzoic acid hydrazide | Do. |
| Do | do | 4-(4'-chloro-carbanilino)benzoic acid hydrazide | Do. |
| Do | Aceto acetic acid-2,4-dimethylanilide | 4-carbanilino-benzoic acid hydrazide | Do. |
| Do | 1-phenyl-3-methyl-pyrazolone-5 | Thiosemicarbazide | Do. |
| Do | do | 4-chloro-benzoic acid hydrazide | Do. |
| Do | do | 4-(4'-chloro-carbanilino)benzoic acid hydrazide | Do. |
| Do | do | 4-acetylamino-benzoic acid hydrazide | Do. |
| Do | do | 4-benzoylamino-benzoic acid hydrazide | Do. |
| 4-amino-phthalic acid | 2-hydroxy-naphthoic acid-(3)-anilide | Thiosemicarbazide | Red. |
| Do | do | 4-carbonamido-benzoic acid hydrazide | Red. |
| Do | do | 4-(4'-chloro-carbanilino)benzoic acid hydrazide | Red. |
| Do | do | 4-benzoylamino-benzoic acid hydrazide | Red. |
| Do | 2-hydroxy-naphthoic acid-(3)-(2'-methyl)-anilide. | Semicarbazide | Red. |
| Do | do | 4-carbanilino-benzoic acid hydrazide | Red. |
| Do | 2-hydroxy-naphthoic acid-(3)-(4'-ethoxy)-anilide. | 4-(4'-chloro-carbanilino)benzoic acid-hydrazide | Red. |
| Do | do | 4-carbonamido-benzoic acid hydrazide | Red. |
| Do | 5-(2',3'-hydroxy-naphthoylamino)-benzimidazolone. | Thiosemicarbazide | Red. |
| Do | do | N-acetyl-hydrazine | Red. |
| Do | do | Benzoic acid hydrazide | Red. |
| Do | do | 4-chloro-benzoic acid hydrazide | Red. |
| Do | do | 4-carbanilino-benzoic acid hydrazide | Red. |
| 3-amino-phthalic acid | do | Semicarbazide | Red. |
| Do | do | Thiosemicarbazide | Red. |
| Do | do | 4-chloro-benzoic acid hydrazide | Red. |
| Do | do | 4-(4'-chloro-carbanilino)benzoic acid hydrazide | Red. |
| Do | do | 4-acetylamino-benzoic acid hydrazide | Red. |
| Do | do | 4-benzoylamino-benzoic acid hydrazide | Red. |
| Do | do | 4-carbonamido-benzoic acid hydrazide | Red. |
| Do | 5-acetoacetylamino-benzimidazolone | 4-carbanilino-benzoic acid hydrazide | Yellow. |
| 4-aminophthalic acid | do | do | Do. |
| 4-amino-5-methoxy-phthalic acid. | do | 4-(4'-chloro-carbanilino)-benzoic acid hydrazide | Do. |
| Do | 2-hydroxy-naphthoic acid-(3)-(4'-acetyl-amino)-anilide. | 4-carbonamido-benzoic acid hydrazide | Red. |
| Do | 1-phenyl-3-methyl-pyrazolone-5 | 4-(2',4',5'-trichloro-carbanilino)-benzoic acid hydrazide | Yellow. |
| Do | Aceto acetic acid 2,5-dimethoxy-5-chloro-anilide. | Thiosemicarbazide | Do. |
| 3-amino-phthalic acid | 2-hydroxy-naphthoic acid-(3)-(2',4'-dimethoxy-5-chloro)-anilide. | Carbanilino-benzoic acid hydrazide | Red. |
| Do | 2-hydroxy-naphthoic acid-(3)-(4'-acetyl-amino)-anilide. | do | Red. |

We claim:
1. Azo dyestuffs which are free from sulfonic acid groups and correspond to the general formula

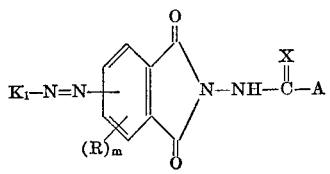

where A is selected from the group consisting of alkyl with 1–9 carbon atoms; cyclohexyl; phenyl; phenyl substituted by a member Cl, $CH_3$, $OCH_3$, $CONH_2$ or $NHOCCH_3$; benzyl, benzyl substituted by a member Cl, $CH_3$, or $OCH_3$; naphthyl, pyridyl; carbanilino phenylene; carbanilino phenylene substituted by a member Cl or $CH_3$, benzoylamino phenylene; and benzoylamino phenylene substituted by a member Cl or $CH_3$; or A is a radical

where $R_1$ and $R_2$ are selected from the group consisting of H; methyl, ethyl and phenyl; R is selected from the group consisting of alkyl with 1–4 carbon atoms, fluorine, chlorine, bromine, methoxy, ethoxy, nitro, or trifluoromethyl; $m$ is an integer from 0 to 3; and $K_1$ is selected from the group consisting of 2-hydroxynaphthoic-acid-anilido; wherein the anilido residue of said 2-hydroxy-naphthoic-acid-anilido is unsubstituted or contains 1–3 substituents selected from the group consisting of methyl, methoxy, ethoxy, nitro, chloro and acetylamino; 3-methyl-pyrazolonyl-5 which is unsubstituted or contains one substituent selected from the group consisting of phenyl, chlorophenyl, methylphenyl, nitrophenyl, carbonamido, and carbomethoxy; acetoacetic acid anilido wherein the anilido residue of said acetoacetic acid anilido is unsubstituted or contains 1–3 substituents selected from the group consisting of chloro, methyl, methoxy, ethoxy and nitro; 2-hydroxy-naphthoic-acid-naphthyl-amido; 2-hydroxy - naphthoylamino - benzimidazolonyl; 1 - phenyl-3 - methyl - 5 - amino - pyrazolyl; acetoacetic acid naphthylamido; acetoacetic acid amino benzimidazolonyl; or acetoacetic acid aminobenzothiazolyl and X is selected from the group NH, S, and O.

2. Monoazo dyestuffs of claim 1 which are free from sulphonic acid groups and correspond to the formula
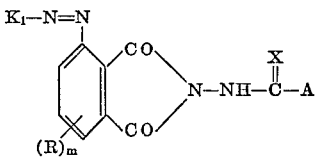
in which A, X, R, $K_1$ and $m$ have the same meaning as in claim 1.
References Cited
FOREIGN PATENTS
6,701,983  9/1967  Netherlands _____ 260—152
CHARLES B. PARKER, Primary Examiner
D. M. PAPUGA, Assistant Examiner
U.S. Cl. X.R.
260—152, 157, 158, 162, 326 N, 558 H, 559 H, 559 S, 562 K; 106—288; 117—154